United States Patent [19]
Trudell et al.

[11] Patent Number: 4,483,061
[45] Date of Patent: Nov. 20, 1984

[54] DOUBLE WALLED TUBING AND PROCESS FOR PRODUCING SAME

[75] Inventors: Gerald R. Trudell; Theodore F. Kraska, both of Pinconning; Dennis W. Barber, Kawkawlin, all of Mich.

[73] Assignee: APX Group, Inc., Toledo, Ohio

[21] Appl. No.: 425,891

[22] Filed: Sep. 28, 1982

[51] Int. Cl.³ .................. B23P 11/02; B23P 19/02
[52] U.S. Cl. .................................. 29/523; 29/525
[58] Field of Search .............. 29/523, 525, 506, 507, 29/455 R, 455 LM, 33 D

[56] References Cited

U.S. PATENT DOCUMENTS 3,156,042 11/1964 Reed ................................. 29/523
3,466,738 9/1969 Mount ............................. 29/525
3,786,555 1/1974 Robertson et al. ................ 29/523
4,257,155 3/1981 Hunter ............................. 29/525
4,293,147 10/1981 Metcaffe et al. .................. 29/525

Primary Examiner—Howard N. Goldberg
Assistant Examiner—Steven E. Nichols
Attorney, Agent, or Firm—Anthony J. Casella; Gerald E. Hespos

[57] ABSTRACT

Double walled tubing, a method and apparatus for producing the same are disclosed. First and second metal tubes of substantially identical diameters are selected. One end of the second tube is expanded, and the first tube is pushed into the second tube. By mounting the first tube on a mandrel having a mandrel ball with an outer diameter which approximates the inner diameter of the first tube, any creases in the first tube caused by the insertion will be removed by the mandrel ball upon withdrawing the mandrel from the first tube.

9 Claims, 11 Drawing Figures

DOUBLE WALLED TUBING AND PROCESS FOR PRODUCING SAME

BACKGROUND OF THE INVENTION

The present invention is directed to the field of automotive and truck tubing, and more particularly to the field of double walled tubing.

The use of double walled tubing, typically employed in the exhaust systems of vans, trucks, and the like, is highly valuable as a noise reduction element. Specifically, double walled tubing may be employed in large trucks, or other large equipment, between the engine and other noise reduction devices, such as the muffler and the like. When employed in this manner, the noise produced by the vehicle engine is significantly reduced due to the resonant properties, or lack thereof, of the double walled tubing. It is well known that a tube comprised of a single wall, when struck or otherwise imparted with energy, will vibrate or "ring" at a given resonant frequency or frequencies. When employed in large vehicles which inherently produce a great deal of noise energy, such single walled tubing can produce extremely undesirable sound levels.

On the other hand, it has been found that double walled tubing has significantly lower resonant properties. When struck or otherwise excited with wide band energy, rather than ring or resonate, the double walled pipe will dramatically attenuate the energy imparted thereto. For example, when dropped from several feet onto a hard surface, the double walled pipe will land with a dull "thud", as opposed to single walled pipe which would cause a great deal of noise.

Heretofore, the only technique for providing such double walled tubing is through the use of a tube mill process whereby two slabs of sheet metal, one right on top of the other, are formed into inner and outer tubes simultaneously in the tube mill. That is, the two sheets of metal are simultaneously formed into an inner and outer tube, and the seams of both the inner and outer tubes are welded simultaneously. This approach has many drawbacks, such as considerable expense, inconsistent quality, and abutting, welded seams. Since the seams on both the inner and outer tubes must be welded substantially simultaneously, the seams must necessarily be one on top of the other. It is therefore virtually impossible to prevent the welding of not only the seams of the inner and outer tubes to their respective counterparts, but also the welding of the inner seam to the outer seam. This is undesirable since axial movement of the inner tube within the outer tube is required during bending or otherwise shaping the double walled tubing. Since the inner and outer tubes are welded together in the prior art double walled tubing, such relative axial movement is severely limited, and the double walled tubing is not easily bent.

OBJECTS AND SUMMARY OF THE INVENTION

It is therefore an object of the invention to overcome the difficulties associated with the prior art technique for forming double walled tubing.

It is a further object of the invention to provide an apparatus for readily and economically forming double walled tubing which does not suffer the drawbacks experienced with the prior art double walled tubing.

It is a further object to provide a method for rapidly and economically forming double walled tubing which does not suffer from the drawbacks associated with the prior art double walled tubing.

It is a further object of the invention to provide double walled tubing which is rapidly and economically manufactured and which does not suffer from the drawbacks associated with the prior art double walled tubing.

In accordance with the first aspect of the invention, a method for producing double walled tubing includes the steps of selecting first and second metal tubes of substantially identical diameters, expanding the diameter of one end of the second tube and pushing the first tube into the second tube, such that respective seams in said first and second tubes are angularly separated from each other by about $\frac{1}{8}$".

Specifically, the step of pushing may include the steps of mounting the first tube on a mandrel having a mandrel ball on the end thereof with an outer diameter which approximates the inner diameter of the first tube, inserting the mandrel and the first tube into the second tube, and withdrawing the mandrel from the first tube, the mandrel ball thereby simultaneously removing creases in the first tube caused by the insertion.

The step of expanding may specifically include the steps of placing a chamfer having an inclined angle of about 140° into one end of the second tube, and pushing the chamfer partially into the one end to thereby expand that end to approximately 6-8% of its original diameter. The step of selecting may include selecting a first tube having at least one end thereof substantially square and minutely smoothed about its periphery. The steps of expanding and pushing may further include the step of clamping the second tube adjacent to the one end, with a clamp relieved from the expanded O.D. of the second tube by about 0.005"-0.007", and placing the other end of the second tube in abutment with a stationary object.

A second aspect of the invention is directed to the double walled tubing produced in accordance with the above described method.

In accordance with a third aspect of the invention, apparatus for inserting a first metal tube into a second metal tube having a diameter substantially identical to that of the first tube includes a device for expanding the diameter of one end of the second tube and a device for pushing the first tube into the second tube. The device for expanding includes a chamfer having an inclined angle of about 140° adapted to be disposed within the one end of the second tube and means for forcing the chamfer partially into that end to thereby expand the end to approximately 6-8% of its original diameter.

The apparatus may further include a clamp having jaws relieved from expanded O.D. of the second tube by about 0.005"-0.007" for clamping the second tube adjacent to the one end, and a stationary device against which the other end of the second tube is adapted to abut.

In accordance with the preferred embodiment, the device for pushing includes a mandrel upon which the first tube is adapted to be mounted, and a mandrel ball on the end of the mandrel having an outer diameter which approximates the inner diameter of the first tube.

BRIEF DESCRIPTION OF THE DRAWINGS

These and other objects, aspects and embodiments of the present invention will be further described with reference to the following drawing figures of which.

DETAILED DESCRIPTION OF THE INVENTION

Figure 1:
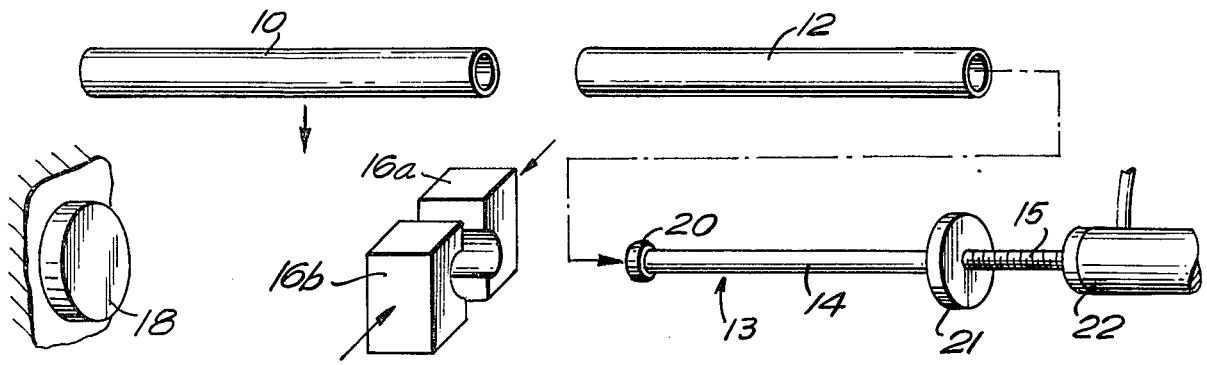
FIGS. 1–8 illustrate the step-by-step process for producing the double walled tubing in accordance with the present invention.

The present invention provides for the insertion of pipe 12 into pipe 10 to produce the double walled tubing. In accordance with the present invention, tubes 10 and 12 may be of exactly the same diameter, and thus taken from the same stock.

Prior to describing the process for producing the double walled tubing, the apparatus for performing the process will be described with reference to FIGS. 1–8. Provided for holding the outer pipe 10 are vice type clamps 16a and 16b and stop 18. Preferably, the jaws of clamps 16a and 16b are relieved from the expanded O.D. of tube 10 by approximately 0.005″–0.007″. The inner tube 12 is associated with a mandrel 13 which is comprised of an Acme threaded mandrel shaft 15 upon which a mandrel stop 21 is threadedly secured. Threaded onto the end of the shaft 15 is a mandrel ball 20. Prior to securing the mandrel ball to the shaft 15, however, a mandrel tube 14 may be disposed about the shaft 15. By rotating the mandrel stop 21 about the shaft 15, the position of the stop 21 can be adjusted to accommodate different size tubing. Of course, the required length of the tube 14 will be governed by the position of the stop 21. The mandrel 13 can be moved toward and away from clamps 16a and 16b by means of ram 22. Finally, chamfer 24 is provided for expanding the end of the outer tube 10.

The process for producing the double walled tubing in accordance with the present invention will not be described still with reference to FIGS. 1–8. The first step as illustrated in FIG. 1 is to select two tubes 10 and 12 which are of substantially the same length and diameter. Contrary to an intuitive understanding of machining or metal working, the inner tube 12 may be of substantially the same diameter as outer tube 10, as long as the process steps in accordance with the present invention are followed. Thus, the tubes 10 and 12 can be selected from the same stock of single walled tubes thus reducing time and expense in fabricating the double walled tubing since two different types of tubes are not required.

Figure 2:
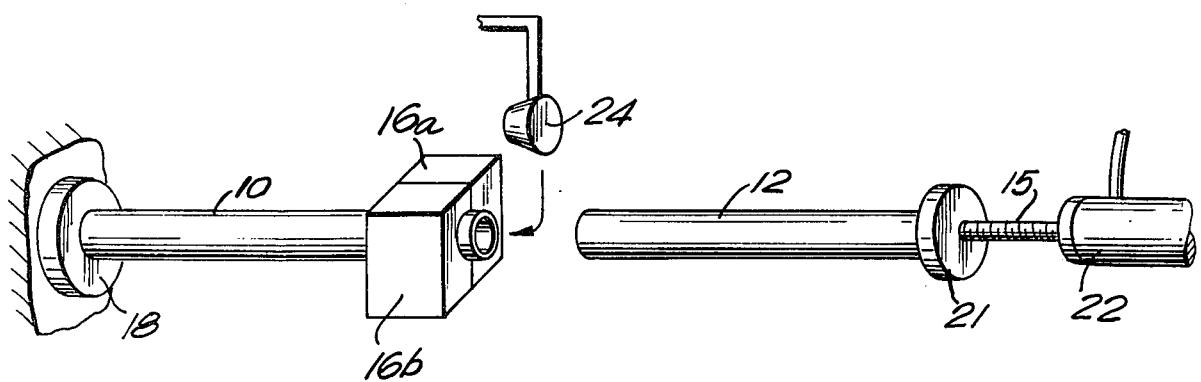
Figure 3:
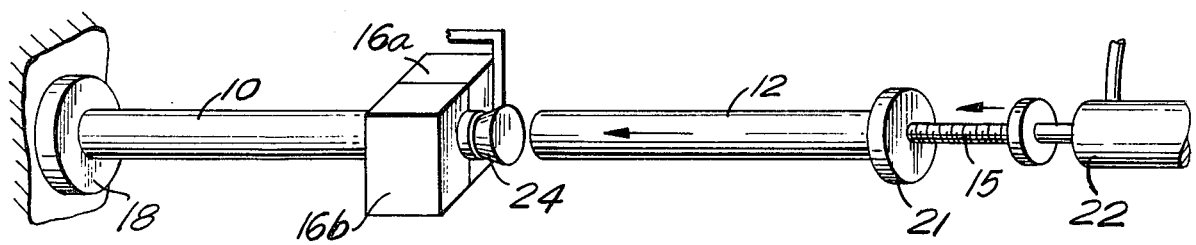
Figure 4:
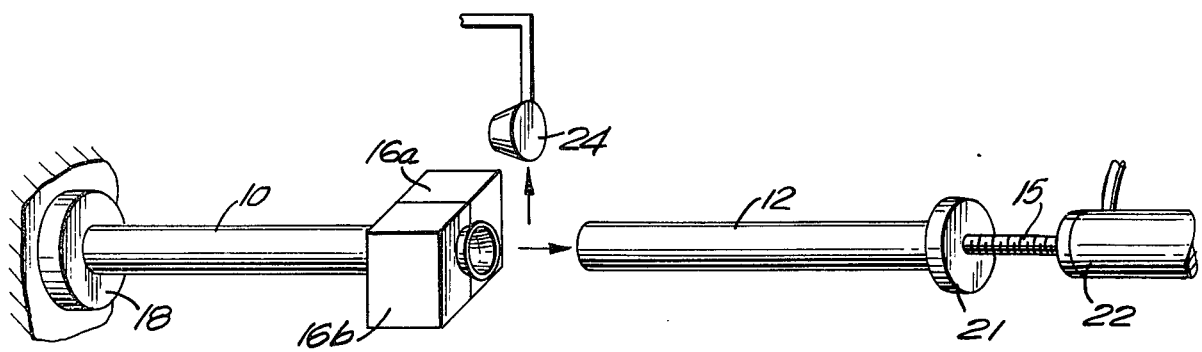
Figure 5:
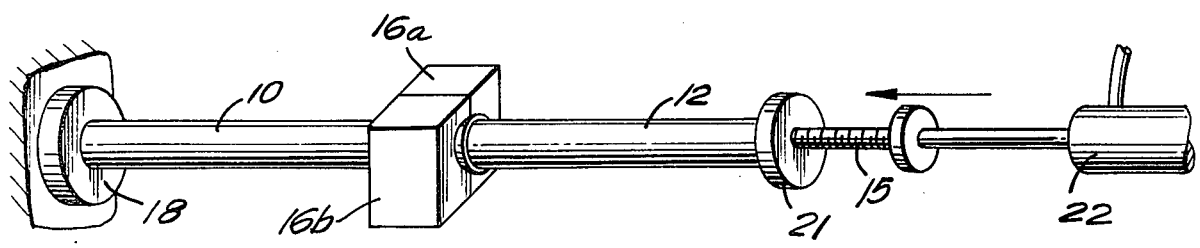
Figure 6:
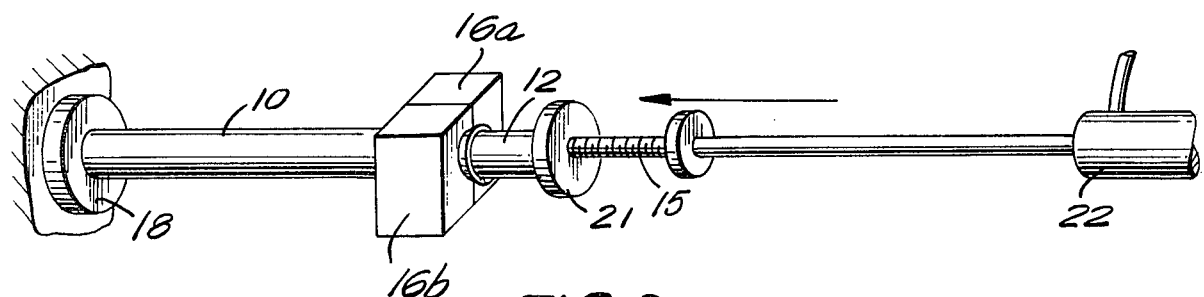
Figure 7:
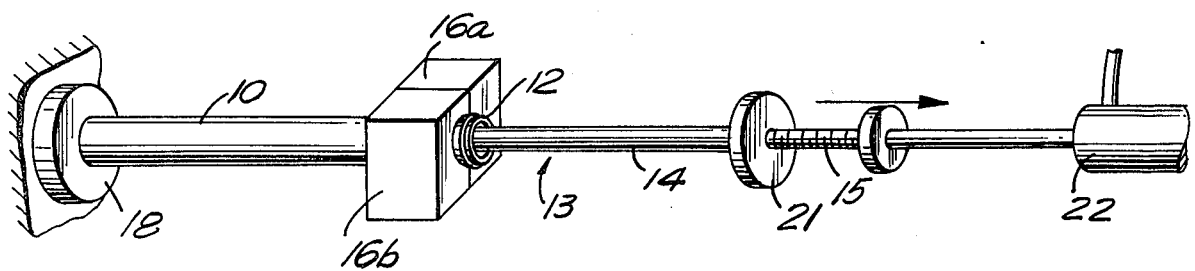
Figure 8:
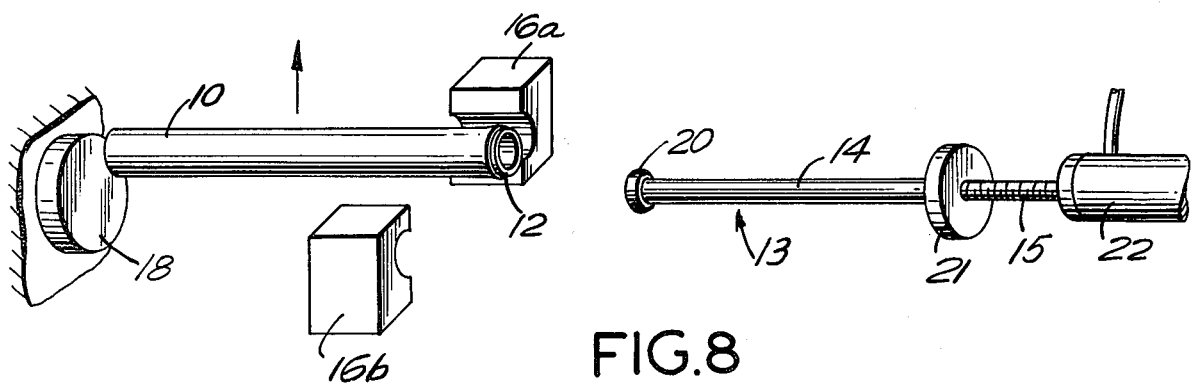

The tubes 10 and 12 are mounted as shown in FIG. 2. Tube 10 is brought into abutment with stop 18 and is clamped by clamps 16a and 16b, and tube 12 is slidably mounted onto mandrel 13 until it abuts the mandrel stop 21. By providing the mandrel tube 14 on the shaft 15, the threads of the shaft 15 will not interfere with the mounting of tube 12 thereon. A relatively small amount of the tube 10 extends through the clamps 16a and 16b. The next step as shown in FIGS. 2 and 3 is to place the chamfer 24 into the end of the tube 10 which extends beyond the clamps 16a and 16b, as best shown in FIG. 3. Ram 22 may then be actuated to push the mandrel, along with the tube 12 mounted thereon, into the chamfer 24 to thus expand the diameter of the end of tube 10 as shown in FIG. 4. The chamfer 24 is removed and the process continues with the actuation of ram 22 to move the mandrel 13 along with tube 12 toward tube 10. Tube 12 along with the mandrel 14 are thereby inserted into tube 10 as illustrated in FIG. 5. Shortly prior to, and during the insertion of tube 12 into tube 10, a lubricant, such as EPTCO SUPERDRAW ETC, available from the Eptert Oil Company, Detroit, Mich., may be applied to the outer portions of tube 12 to facilitate this operation. Ram 22 is actuated until, or almost until (FIG. 6) mandrel stop 21 abuts the end of tube 10, at which time the ram 22 is actuated in the reverse direction (FIG. 7) to thereby withdraw the mandrel 13 from tube 12. Upon fully withdrawing mandrel 13 from the tubes, as shown in FIG. 8, the clamps 16a and 16b may be separated and the double walled tubing may be removed.

Figure 9:
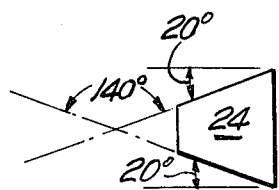
FIG. 9 is an illustration showing the preferred angles provided by the chamfer.

Although intuitively impossible, or at least extremely difficult, the process according to the present invention allows the nesting of two tubes of substantially identical diameters. This is accomplished by first opening up the end of tube 10 by the chamfering operation. A chamfer having a 140° inclined angle has been found to be most efficient. More specifically, the chamfer 24 is provided with a 20° angle with respect to an axial line about its entire periphery, as illustrated in detail in FIG. 9. Further, the expanded diameter of the end of tube 10, after the chamfering operation has also been found to be critical, the expanded diameter affecting the material flow of the inner tube. An expanded diameter of 6–8% greater than the nominal tube O.D. has been found most desirable.

It has also been found that the end cut condition of the leading edge of the inner tube 12 affects the assembly of the tubes. A square (90°) rotary, lathe type cut has been found to be most desirable, the leading edge of the tube 12 necessarily having to be square and free of sharp corners. Preferably, the tubes are chamfered (0.010″−0.020″×45°) at the ends of the tubes about the tube O.D.'s to produce a minute smoothing of the edges of the tubes. Since such operation is readily acccomplished, the edges of both the inner and outer tubes 10 and 12 can be provided with the above smoothing, to thereby allow the operator to select the tubes from the same stock.

Figure 10:
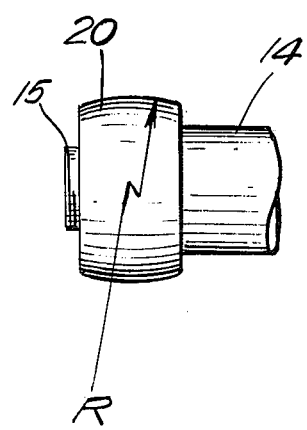
FIG. 10 is a side view of the mandrel ball employed on the end of the mandrel.

The mandrel ball 20 is provided to insure that the cross-section of the tube 12 is substantially round after withdrawal of the mandrel 13 therefrom. That is, in the event that an inward creasing of the inner tube 12 occurs upon insertion, the mandrel ball 20 functions to coin the I.D. of the inner tube to thus improve the quality of the tubing significantly. Ideally, the mandrel ball 20 is configured in a generally cylindrical form, but is provided with a radius R as shown in FIG. 10 to insure smooth withdrawal of the mandrel 13 from tube 12. The radius R should be about one-half the outer diameter of the double walled tubing ±0.010″. The maximum diameter of the mandrel ball 20 will depend on the O.D. of the double walled tubing and the thickness of the tubes employed. For example, for 3″ O.D. double walled tubing using 0.049″ thick tubes, the maximum diameter should be about 2.780″±0.001″, while the diameter will be reduced to about 2.739″±0.001″ for 0.065″ thick tubes. For 5″ O.D. double walled tubing using 0.049″ thick tubes, the maximum diameter will be about 4.780″±0.001″, while for 0.065″ thick tubing a diameter of about 4.739″±0.001″ will be employed.

Figure 11:
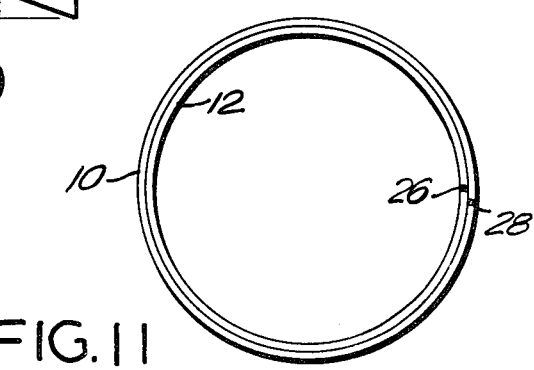
FIG. 11 is a cross-sectional view of the double walled pipe produced in accordance with the present invention.

FIG. 11 is a cross-sectional view of the double walled tubing produced in accordance with the present invention. Illustrated therein is inner tube 12, outer tube 10 and welds 26 and 28 for the inner and outer tubes, respectively. Since the tubes 10 and 12 are already completely fabricated prior to use with the present invention, there is no possibility of inadvertently welding tubes 10 and 12 together. Ideally, the operator will mount tubes 10 and 12 as shown in FIGS. 1 and 2 such that the welded seems 26 and 28 are angularly separated by less than approximately one inch, preferably on the order of one eighth of an inch. By placing the welds fairly close to each other, the double walled tube can be bent or shaped relative to a single effective seam location. Even though the inner and outer tubes fit extremely tightly against one another, the inner and outer tubes can move axially relative to each other when bent to accommodate virtually any type of bending requirement.

Thus, the double walled tubing produced in accordance with the present invention is exceptionally rapid and economical to fabricate, of extremely high quality due to the extremely tight fit between the tubes, and exceptionally well suited to virtually any type of bending requirement due to the completely separate seams.

Although the present invention has been described with reference to the foregoing specification and drawings, the scope of the invention will now be described with reference to the following claims.

What is claimed is

1. A method for producing double walled tubing, comprising:
   selecting first and second metal tubes of substantially identical diameters, said first and second tubes including longitudinally extending seams;
   expanding the diameter of one end of said second tube; and
   pushing said first tube into said second tube for substantially the entire length of said second tube such that the respective seams in said first and second tubes are angularly separated from each other by about ⅛".

2. A method for producing double walled tubing, comprising:
   selecting first and second metal tubes of substantially identical diameters, said first and second tubes having opposed ends and having longitudinally extending seams extending therebetween;
   expanding the diameter of one end of said second tube;
   mounting said first tube on a mandrel having a mandrel ball on the end thereof with an outer diameter which approximates the inner diameter of said first tube;
   pushing said mandrel and said first tube into said second tube such that the respective seams in said first and second tubes are angularly separated from each other by about ⅛"; and
   withdrawing said mandrel from said first tube and simultaneously removing creases in said first tube caused by said pushing.

3. The method of claim 2 wherein said step of expanding comprises the steps of placing a chamfer having an inclined angle of about 140° into said one end of said second tube, and pushing said chamfer partially into said one end to thereby expand said one end to approximately 6–8% of its original diameter.

4. The method of claim 3 wherein the step of selecting comprises selecting a first tube having at least one end thereof substantially square and minutely smoothed about its periphery.

5. The method of claim 4 wherein said steps of expanding and pushing include the steps of clamping said second tube adjacent to said one end with a clamp relieved from the expanded O.D. of the second tube by about 0.005"–0.007", and placing the other end of said second tube in abutment with a stationary object.

6. Apparatus for inserting a first metal tube into a second metal tube having a diameter substantially identical to that of said first tube, comprising means for expanding the diameter of one end of said second tube and means for pushing the first tube into the second tube for substantially the entire length of said second tube, said means for expanding comprising a chamfer having an inclined angle of about 140° adapted to be disposed within said one end of said second tube, and means for forcing said chamfer partially into said one end to thereby expand said one end to approximately 6–8% of its original diameter.

7. The apparatus of claim 6 further comprising clamp means for clamping the second tube adjacent to said one end and stationary means against which the other end of said second tube is adapted to abut, said clamp means having jaws relieved from the expanded O.D. of the second tube by about 0.005"–0.007".

8. The apparatus of either of claims 6 or 7 wherein said means for pushing comprises a mandrel upon which said first tube is adapted to be mounted, and a mandrel ball on the end of said mandrel having an outer diameter which approximates the inner diameter of said first tube.

9. An apparatus for inserting a first metal tube into a second metal tube having a diameter substantially identical to that of said first tube, said apparatus comprising means for expanding the diameter of one end of said first tube, a mandrel upon which said first tube is adapted to be mounted, and a mandrel ball on the end of said mandrel having an outer diameter which approximates the inner diameter of said first tube, said means for expanding comprising a chamfer having an inclined angle of about 140° adapted to be disposed within said one end of said second tube, and means for forcing said chamfer partially into said one end to thereby expand said one end to approximately 6–8% of its original diameter.

* * * * *